United States Patent
Tee et al.

(10) Patent No.: US 7,225,289 B2
(45) Date of Patent: May 29, 2007

(54) VIRTUAL IDE STORAGE WITH PCI EXPRESS INTERFACE

(75) Inventors: Boon-Kuew Tee, Taipei (TW); Wee-Kuan Gan, Taipei (TW)

(73) Assignee: Phison Electronics Corporation, Taipei (TW)

( * ) Notice: Subject to any disclaimer, the term of this patent is extended or adjusted under 35 U.S.C. 154(b) by 109 days.

(21) Appl. No.: 10/906,934

(22) Filed: Mar. 14, 2005

(65) Prior Publication Data
US 2006/0206653 A1    Sep. 14, 2006

(51) Int. Cl.
*G06F 13/00* (2006.01)
(52) U.S. Cl. ...................................... 710/315; 711/115
(58) Field of Classification Search ................ None
See application file for complete search history.

(56) References Cited

U.S. PATENT DOCUMENTS 6,292,863 B1 * 9/2001 Terasaki et al. ............ 710/313
2005/0055481 A1 * 3/2005 Chou et al. ................. 710/52
2005/0120146 A1 * 6/2005 Chen et al. ................. 710/22
2005/0160218 A1 * 7/2005 See et al. ................... 711/103
2006/0047880 A1 * 3/2006 Lindblom et al. .......... 710/305
2006/0149860 A1 * 7/2006 Diamant ..................... 710/15
2006/0168387 A1 * 7/2006 Gan et al. ................... 710/305
2006/0168391 A1 * 7/2006 Gan et al. ................... 711/103

* cited by examiner

*Primary Examiner*—Glenn A. Auve
(74) *Attorney, Agent, or Firm*—Jianq Chyun IP Office

(57) ABSTRACT

The present invention discloses a virtual integrated drive electronics (IDE) storage device with a peripheral component interconnect (PCI) Express interface. The storage device includes a microcontroller connected to a PCI Express connecting interface and a flash memory separately. The microcontroller includes a flash memory interface, a PCI Express interface and a virtual IDE module. The virtual IDE module includes an IDE host and an IDE device. When the host sends an instruction for storing or reading data to a flash memory, the instruction will be sent to and executed in the virtual IDE module. The data in the flash memory can be transmitted at a transmission rate up to the standard of an IDE device, and the host will consider the storage device as an IDE device instead of a PCI Express device only.

5 Claims, 2 Drawing Sheets

VIRTUAL IDE STORAGE WITH PCI EXPRESS INTERFACE

BACKGROUND OF THE INVENTION

1. Field of the Invention

The present invention relates to a virtual integrated drive electronics (IDE) storage device with a peripheral component interconnect (PCI) Express interface, and more particularly to a virtual IDE storage device that uses the PCI Express interface as a transmission interface. interface.

2. Description of the Related Art

As the science and technology of computers grows in a fast changing manner, a computer tends to be developed with powerful computational functions and a fast speed, and thus the clock of a central processing unit (CPU) is too fast, and the transmission rate of other peripheral equipments cannot catch up with the processing speed of the CPU at all. Even though the CPU continues enhancing its performance, the transmission rate of peripheral equipments cannot be improved much because the overall performance of a computer depends on the whole system. It is necessary to improve the whole computer architecture before the performance of a CPU can be maximized.

However, the data transmission rate depends on the transmission rate of a bus. To enhance the performance of a computer, related manufacturers usually improve the transmission rate of a bus. For example, the transmission rate of an integrated drive electronic (IDE) interface connected to a hard disk drive reaches 160 MB/s; the network line is upgraded from 10 MB/s to 1 GB/s; the transmission rate of the RS-232 is replaced by the 480 MB/s of the universal serial bus (USB), and the present PCI with a transmission rate of 133 MB/s upgrades the transmission rate of its lane to 250 MB/s which is know as a new-generation peripheral component interconnect express (PCI Express). The PCI Express further supports a hot-plug control function. Therefore, the PCI Express is extensively accepted by users.

Further, the flash memory since its announcement gradually replaces the EEPROM or battery power memory in many portable device due to its charming features including low power consumption, non-volatility, shock resistance, and high-capacity storage. With the advanced semiconductor technologies, the storage capacity and transmission rate of a flash memory grow rapidly. The flash memory replaces traditional storage medium such as a hard disk drive in many applications, but most of the present storage devices made of flash memories use the universal serial bus (USB) or integrated drive electronics (IDE) interface as the transmission interface. The transmission rate of the USB and IDE interface are just 480 MB/s and 160 MB/s respectively, and such transmission rates cannot catch up with the accessing speed of the flash memory. Therefore, the applications of the storage device made of this kind of flash memory is restricted by the USB or IDE interface of the host, and its performance cannot be maximized.

Further, a software developing system or a software program usually provides several environment interfaces that integrate editing, compiling, debugging, file management and execution. The environment interface lets programmers develop a majority of an application program, and thus the software executed at the host end is communicated by a specific environment interface and peripherals. A peripheral must have the environment interface of the host before the peripheral can execute an instruction transmitted from the host.

Therefore, using a bus with a faster transmission rate as a transmission interface to maximize the performance of a memory card is an important subject for manufacturers in the related field to make further improvements.

Therefore, it is desirable to provide a card reader that eliminates the aforesaid drawbacks.

SUMMARY OF THE INVENTION

The present invention has been accomplished under the circumstances in view. Therefore, it is a primary objective of the present invention to use the PCI Express as a transmission interface between a host and a storage device, and the storage device has a virtual IDE module capable of communicating with the host, such that the storage device can achieve the best transmission rate when accessing data in a flash memory, and the storage device also has the features of an IDE interface.

To achieve the foregoing objective, the storage device comprises a microcontroller, and the microcontroller is connected separately to a PCI Express bus in a host and flash memory, and the microcontroller has a flash memory interface, a PCI Express interface, and a virtual IDE module, such that if the host gives an instruction to a flash memory for storing or reading data, the instruction will be sent to the virtual IDE module and the execution of the instruction will be completed by the virtual IDE module. The data in the flash memory follows the instruction, and the flash memory interface and the PCI Express interface in the microcontroller converts the data into a data format acceptable to the flash memory or the PCI Express bus. The data is then sent to the host or the flash memory, such that the host can give instruction to the flash memory through the virtual IDE module for accessing data, and the data transmission rate can meet the transmission rate of the PCI Express standard without losing the feature of an IDE interface.

DETAILED DESCRIPTION OF THE PREFERRED EMBODIMENT

Figure 1:
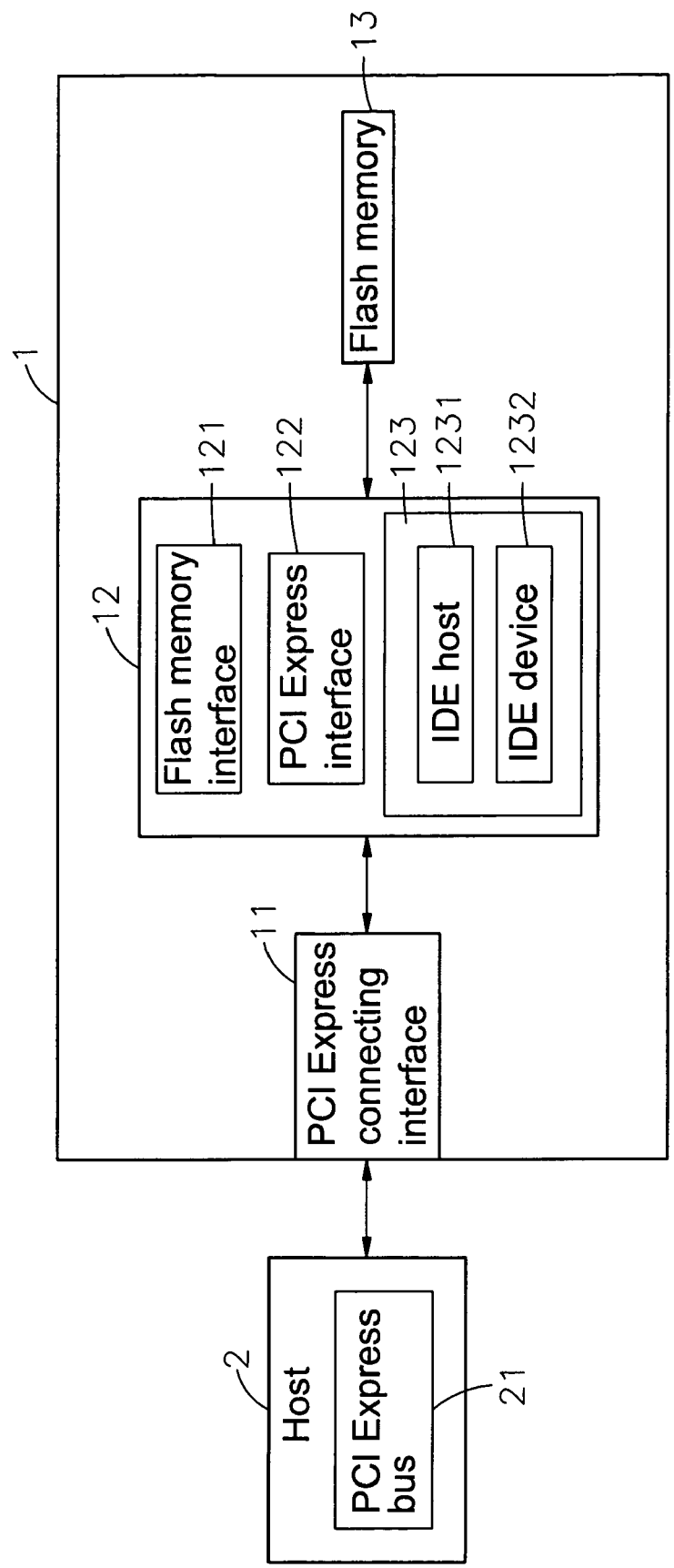
FIG. 1 is a block diagram according to a preferred embodiment of the present invention.

In FIG. 1, a storage device 1 of the present invention comprises a PCI Express connecting interface 11, a microcontroller 12 and a flash memory 13.

The PCI Express connecting interface 11 is provided for connecting to a PCI Express bus 21 of a host 2.

The microcontroller 12 includes a memory card interface 121, a PCI Express interface 122 and a virtual IDE module 123. The virtual IDE module 123 includes an IDE host 1231 and IDE device 1232, and the microcontroller 12 is connected to the PCI Express connecting interface 11. The virtual IDE module 123 is not physical, but it is virtual and simulated by a designer's firmware program.

The flash memory 13 is connected to the microcontroller 12.

When the PCI Express connecting interface 11 of the storage device us connected with the PCI Express bus 21 of the host 2, the microcontroller 12 of the storage device 1 will declare to the host 2 that the storage device 1 is an IDE host, such that the host 2 will consider the microcontroller 12 as an IDE host, even though the host 2 remains communicating with the microcontroller 12 by the PCI Express architecture.

When the host issue an IDE saving instruction, the instruction will be sent to the IDE host 1231 of the virtual IDE module 123 of the microcontroller 2 first, and then the IDE host 1231 will send the instruction to the IDE device 1232, and the IDE device 1232 will complete the execution of the instruction. At that time, the data of the host 2 will be sent to the mircocontroller 12 through the PCI Express bus 21 and the PCI Express connecting interface 11, and the flash memory interface 121 in the microcontroller 12 will convert the data into a data format acceptable to the flash memory 3, and the data is stored in the flash memory 3.

In addition, when the host 2 needs to read a data stored in the storage device 1, the IDE instruction will be sent to the IDE host 1231 of the virtual IDE module 123 in the microcontroller 12 first, and then the IDE host 1231 will sent the instruction to the IDE device 1232, and the IDE device 1232 will complete the execution of the instruction. At that time, the flash memory 3 will send the data to the microcontroller 12, and the PCI Express interface 122 in the microcontroller 12 will convert the data into a data format acceptable to the PCI Express bus 21 and then the data is sent to the host 2 through the PCI Express connecting interface 11 and the PCI Express bus 21.

Furthermore, the IDE instruction may be an ATA or Serial ATA format. Here, the ATA and Serial ATA are example for the IDE instruction, and therefore the scope of the present invention is not limited thereby.

As description above, when the host 2 reads or stores data to storage device 1, the data is read from or written into the flash memory 3 through the microcontroller 12, and the read or write instruction is executed and completed by the IDE host 1231 and the IDE device 1232 of the virtual IDE module 123. Therefore, the host 2 may identify the storage device 1 as an IDE storage device with a PCI Express.

When the host 2 issues an instruction without the data processing, the instruction is completed in the virtual IDE module 123, and the microcontroller 12 may not communicate with the flash memory 13.

Figure 2:
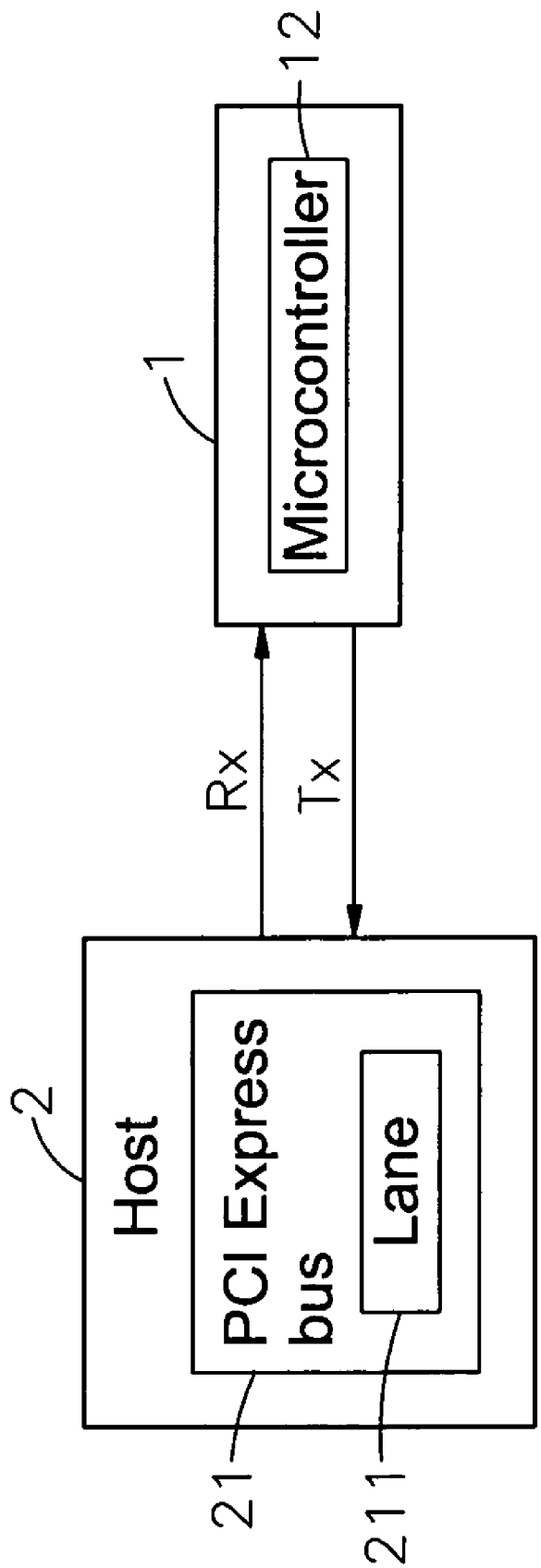
FIG. 2 is a schematic diagram of a data transmission according to a preferred embodiment of the present invention.

In FIG. 2, the host 2 and the storage device 1 has a lane 211 at a physical layer for transmitting data, and the lane 211 is comprised of a transmitting end (Tx) and a receiving end (Rx), and the quantity of the lanes 211 could be one or more.

Therefore, the virtual IDE storage device with the PCI Express interface according to the present invention can reduce the problems of the conventional art. The present invention uses an IDE host and an IDE device in the storage device to execute the instruction given by the host and also uses a PCI Express interface as the transmission interface between the host and the storage device, such that the data can be transmitted at a transmission rate that can meet the PCI Express standard, and the storage device can have the best transmission rate.

A prototype of virtual IDE storage device with PCI Express interface has been constructed with the features of FIGS. 1–2. The virtual IDE storage device with PCI Express interface functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A virtual integrated drive electronics (IDE) storage device with a peripheral component interconnect (PCI) Express interface, comprising:

a microcontroller, having a flash memory interface and a PCI Express interface capable of converting a data into a flash memory format or a PCI Express format, and a virtual IDE module capable of receiving an instruction given by a host, and said virtual IDE module having an IDE host for receiving an IDE instruction given by said host and an IDE device for completing execution of said IDE instruction;

a flash memory, coupled to said microcontroller for storing or reading data;

a PCI Express connecting interface, configured for connecting to a PCI Express bus disposed in said host, and provided for coupling said microcontroller to said host, such that when said host stores or reads a data of a flash memory, said microcontroller of said storage device will declare to said host that said storage device is an IDE host, and said IDE instruction given by said host will be sent to said virtual IDE module and the execution of said instruction will be completed by said virtual IDE module, and said data in said flash memory will follow said instruction, and said data will be converted by said flash memory interface and said PCI Express interface of said microcontroller into a data format acceptable by said flash memory or said PCI Express bus, and then said data will be sent to said host or stored in said flash memory.

2. The virtual IDE storage device with PCI Express interface as claimed in claim 1, wherein said IDE instruction complies with an ATA specification.

3. The virtual IDE storage device with PCI Express interface as claimed in claim 1, wherein said IDE instruction complies with a Serial ATA specification.

4. The virtual IDE storage device with PCI Express interface as claimed in claim 1, wherein said host and said storage device have at least one lane at a physical layer for transmitting data, and said lane comprises a transmitting end (Tx) and a receiving end (Rx).

5. The virtual IDE card reader with PCI Express interface as claimed in claim 4, wherein said at least one lane comprises a plurality of lanes.

* * * * *